US006675308B1

United States Patent
Thomsen

(10) Patent No.: US 6,675,308 B1
(45) Date of Patent: Jan. 6, 2004

(54) METHODS OF DETERMINING WHETHER A NETWORK INTERFACE CARD ENTRY WITHIN THE SYSTEM REGISTRY PERTAINS TO PHYSICAL HARDWARE OR TO A VIRTUAL DEVICE

(75) Inventor: Brant D. Thomsen, West Valley City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/568,862

(22) Filed: May 9, 2000

(51) Int. Cl.[7] .................................................. G06F 9/00
(52) U.S. Cl. ........................ 713/401; 713/100; 713/401
(58) Field of Search .................................. 713/401, 100

(56) References Cited

U.S. PATENT DOCUMENTS

| 5,732,282 | A | * | 3/1998 | Provino et al. ............. 709/324 |
| 6,003,097 | A | * | 12/1999 | Richman et al. ................ 710/8 |
| 6,295,556 | B1 | * | 9/2001 | Falcon et al. ............... 709/220 |
| 6,353,862 | B1 | * | 3/2002 | Hamilton .................... 709/323 |
| 6,487,608 | B2 | * | 11/2002 | Gifford et al. .................. 710/8 |
| 6,493,751 | B1 | * | 12/2002 | Tate et al. ................... 709/221 |
| 6,496,893 | B1 | * | 12/2002 | Arai ............................ 710/302 |

OTHER PUBLICATIONS

Rune Bundesen wrote under Newsgroups:comp.os.ms–windows.programmer.networks; Sub: How do I detect which adapter exist on my NT machine?; date: Mar. 6, 1998.*

Christopher Chlap wrote under Newsgroups:comp.os.ms–windows.programmer.networks; Sub: How do I detect which adapter exist on my NT machine?; date: Mar. 9, 1998.*

Helge Kruse wrote under Newgroups:comp.os.ms–windows.programmer.networks; Sub: Can not get hw parameters with NdisReadConfiguration; date: May 15, 1996.*

Carlos Augusto Grahl wrote under Newsgroups:microsoft.public.win32.programmer.networks; Sub: Network Protocol properties; date: May 14, 1998.*

* cited by examiner

*Primary Examiner*—Dennis M. Butler
*Assistant Examiner*—N C Patel

(57) ABSTRACT

Methods of determining whether a network interface card entry within the system registry of a Windows™-based operating system pertains to "real" physical hardware or to a "virtual" device. In one embodiment of the present invention, the method includes the steps of: (1) opening the HKEY_LOCAL_MACHINE\ System\ Current ControlSet \Services\Class\Net key entry of the system registry; (2) examining each of the sub-keys for the "Net" key, and find one with a "DriverDesc" string value matching a NIC; (3) opening the "Ndi" key under the matching sub-key; (4) getting the "DeviceID" string value under the "Ndi" key; and, (5) searching the "DeviceID" string for a backslash "\" character. If the backslash character is found, then it can be concluded that the network interface card entry is associated with "real" physical hardware. Otherwise, it can be concluded that the network interface card entry is associated with a "virtual" device. In one particular embodiment, the present invention is implemented as part of a network configuration software or network monitoring software and allows users or system administrators to more easily monitor and modify the settings for network interface cards installed on a computer system running on Windows 95® or Windows 98® operating systems.

24 Claims, 4 Drawing Sheets

METHODS OF DETERMINING WHETHER A NETWORK INTERFACE CARD ENTRY WITHIN THE SYSTEM REGISTRY PERTAINS TO PHYSICAL HARDWARE OR TO A VIRTUAL DEVICE

FIELD OF THE INVENTION

The present invention pertains generally to the field of computer networking. More particularly, the present invention pertains to software applications used for configuring networking hardware installed on a computer system.

BACKGROUND OF THE INVENTION

Computer networks can be arranged in numerous configurations and in a variety of network types. Some of the most popular types of networks are Ethernet (coaxial cable or twisted-pair cable), token ring, Fiber Distributed Data Interface (FDDI), Frame Relay, Integrated Services Digital Network (ISDN), X.25, and Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PC) in a home or single business site (location) usually communicate with each over a LAN. Groups of PCs that are at remote locations from one another, such as those in different homes, different companies, or different branch offices of the same company, typically communicate with each other over a WAN. Most WANs typically require significant resources to provide service to a large number of users spread over a vast geographical area causing a WAN to be relatively expensive to build and maintain.

Some users utilize the Internet for virtual private networking to avoid the costs of a true private WAN network and\or paying for long distance communication bills. In essence, virtual private networking entails encrypting and decrypting IP packets for transport across the Internet. In some virtual private networks (VPNs), the payload portion of an IP packet is encrypted for transport across the Internet. The header information is left intact so that routers can forward the packet as it traverses the Internet. In other VPNs, an entire IP packet is encrypted and then encapsulated into new IP packets for transport across the Internet.

One use of the VPN is that it allows a mobile computer system (e.g., a Laptop) to be connected to a remote LAN. Typically, a user of the mobile computer system initiates a local call to an Internet Service Provider (ISP) and establishes an Internet session. Then, the mobile computer system sends an Internet message via the Internet to the remote LAN. The mobile system and the remote LAN then engage in a security protocol or handshaking to verify the user is an authorized user permitted to have access to the LAN. Once it is established the user is authorized to have access to the second LAN, a VPN is established, allowing the user and the remote computer system to access data stored within the LAN.

Windows 95® and Windows 98® operating systems, however, do not provide native support for several types of VPNs. Therefore, a VPN software package is typically required to be installed in a system to provide for such specialized networking needs. "Virtual" network interface cards (NICs) are often installed as part of a VPN software package. By way of background, "real" NICs are those associated with one or more pieces of hardware installed on the computer. They include PCI NIC cards, ISA NIC cards, PCMCIA NIC cards, USB NIC cards, etc. A "virtual" NIC is one that is not associated with any hardware. Some examples of "virtual" NICs include "Dial-Up Networking," "Internet Connection Sharing," and "VPN." Virtual NICs are well known in the art and are a common way of providing specialized networking support.

Windows 95® and Windows 98® operating systems store information about each NIC installed on the system in the system registry regardless of whether the NIC is "real" or "virtual." Thus, problems may arise when network configuration software or network monitoring software are interested in dealing with information specific to each NIC card. For instance, using conventional techniques, network configuration software or network monitoring software would be able to identify the NICs that are installed in the computer system by examining each sub-key under the "Net" class registry key for the system's current services, and getting its "DeviceDesc" string value. However, conventional network configuration software or network monitoring software would not be able to distinguish whether a NIC is "real" or "virtual."

One solution is to maintain a list of known "virtual" NICs that the network configuration software can check against. In the past, when there were only a small number of "virtual" NICs that were likely to be found on a computer, it was feasible for network configuration software to keep track of such a list. However, that approach is undesirable because, as VPNs gain popularity, more and more new "virtual" NICs are entering the marketplace. Consequently, network configuration software and network monitoring software having the latest list of known "virtual" NICs need to be constantly updated.

Therefore, what is needed is a method that allows a system administrator or end-user to more easily monitor or modify the settings for "real" NICs installed on a client computer. What is also needed is a method that allows users to differentiate between "real" NICs and "virtual" NICs installed on a computer system.

SUMMARY OF THE DISCLOSURE

Accordingly, the present invention provides a method of determining whether a network interface card entry within the system registry of a Windows™-based operating system pertains to "real" physical hardware or to a "virtual" device. In one particular embodiment, the present invention is implemented as part of a network configuration software or network monitoring software and allows users or system administrators to more easily monitor and modify the settings for network interface cards installed on a computer system running on Windows 95® or Windows 98® operating systems.

In accordance with one embodiment of the present invention, the method includes the steps of: (1) opening the "HKEY_LOCAL_MACHINE\System\CurrentControlSet\Services\Class\Net" key entry of the system registry; (2) examining each of the sub-keys for the "Net" key, and find one with a "DriverDesc" string value matching a NIC; (3) opening the "Ndi" key under the matching sub-key; (4) getting the "DeviceID" string value under the "Ndi" key; and, (5) searching the "DeviceID" string for a backslash "\" character. If the backslash character is found, then it can be concluded that the network interface card entry is associated with "real" physical hardware. Otherwise, it can be concluded that the network interface card entry is associated with a "virtual" device.

Embodiments of the present invention include the above and further include a computer readable medium having contained therein computer readable codes for causing a computer system running on a Windows™-based operating system to perform a method of determining whether a network interface card entry of a system registry of the computer system is associated with physical hardware device, the method comprising the steps of: (1) opening a Net key entry of the system registry wherein the Net key entry includes a plurality of sub-key entries and wherein the Net key entry stores registry entries pertinent to network interface cards; (2) opening a respective one of the plurality of sub-key entries; (3) examining a driver description string stored within the respective sub-key entry; (4) provided that a value stored as part of the driver description string matches the network interface card entry, opening an "Ndi" key under the respective sub-key entry and searching for a backslash character within a device identification string under the "Ndi" key, wherein presence of the backslash character indicates that the network interface card entry is associated with physical hardware device.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

COMPUTER SYSTEM PLATFORM

Figure 1:
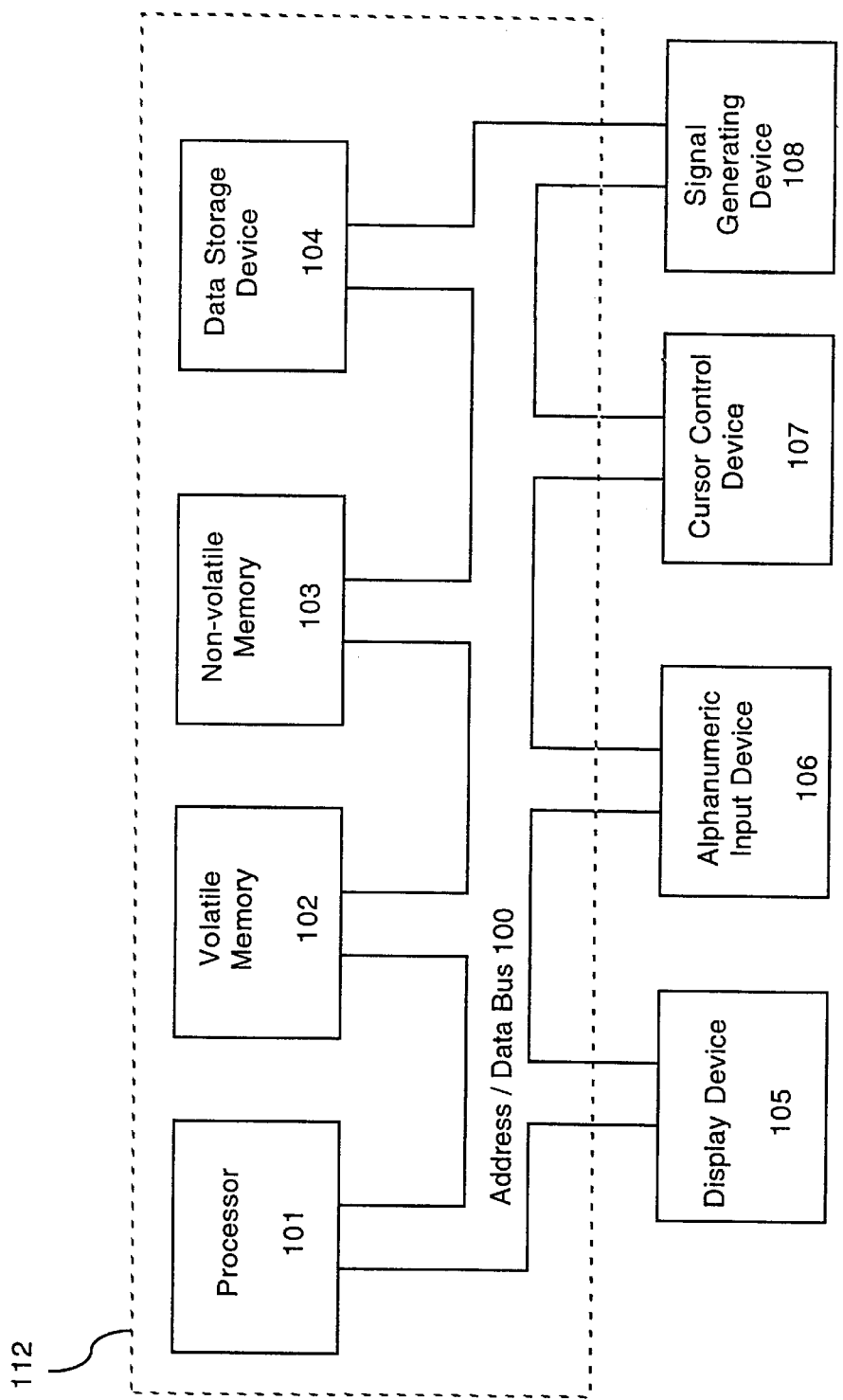
FIG. 1 illustrates an exemplary computer system platform upon which embodiments of the present invention may be practiced.

With reference to FIG. 1, portions of the present invention are comprised of computer-readable and computer executable instructions which reside, for example, in computer-usable media of a computer system. FIG. 1 illustrates an exemplary computer system 112 on which embodiments (e.g., process 300 and process 400) of the present invention may be practiced. It is appreciated that system 112 of FIG. 1 is exemplary only and that the present invention can operate within a number of different computer systems including general purpose computer systems, embedded computer systems, and stand alone computer systems specially adapted for controlling automatic test equipment.

Computer system 112 includes an address\data bus 100 for communicating information, a central processor 101 coupled with bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions. Data storage device 104 can include one or more removable magnetic or optical storage media (e.g., diskettes, tapes) which are computer readable memories. Memory units of system 112 include volatile memory 102, non-volatile memory 103 and data storage device 104.

Computer system 112 can further include an optional signal generating device 108 (e.g., a modem, or a network interface card "NIC") coupled to the bus 100 for interfacing with other computer systems. Also included in computer system 112 of FIG. 1 is an optional alphanumeric input device 106 including alphanumeric and function keys coupled to the bus 100 for communicating information and command selections to the central processor 101. Computer system 112 also includes an optional cursor control or directing device 107 coupled to the bus 100 for communicating user input information and command selections to the central processor 101. An optional display device 105 can also be coupled to the bus 100 for displaying information to the computer user. Display device 105 may be a liquid crystal device, other flat panel display, cathode ray tube, or other display device suitable for creating graphic images and alphanumeric characters recognizable to the user. Cursor control device 107 allows the computer user to dynamically signal the two dimensional movement of a visible symbol (cursor) on a display screen of display device 100. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and\or activated via input from alphanumeric input device 106 using special keys and key sequence commands. The present invention is also well suited to directing a cursor by other means such as, for example, voice commands.

SYSTEM REGISTRY OF WINDOWS OPERATING SYSTEMS

The system registry is a database used for storing settings and options for the 32 bit versions of Microsoft® Windows™ operating systems including Windows 95® and Windows 98®. The registry contains information and settings for many of the hardware, software, users, and preferences of a computer system. Whenever a user makes changes to a "Control Panel" settings, file associations, system policies, or installs new software and\or hardware, the changes are usually reflected and stored in the system registry. In most Windows 95® and Windows 98® computer systems, the physical files that make up the registry are stored in two hidden files under the "C:\WINDOWS" directory, called "USER.DAT" and "SYSTEM.DAT," and can be edited with a Registry Editor (regedit.exe) that is included in most versions of Windows™ operating systems.

Figure 2:
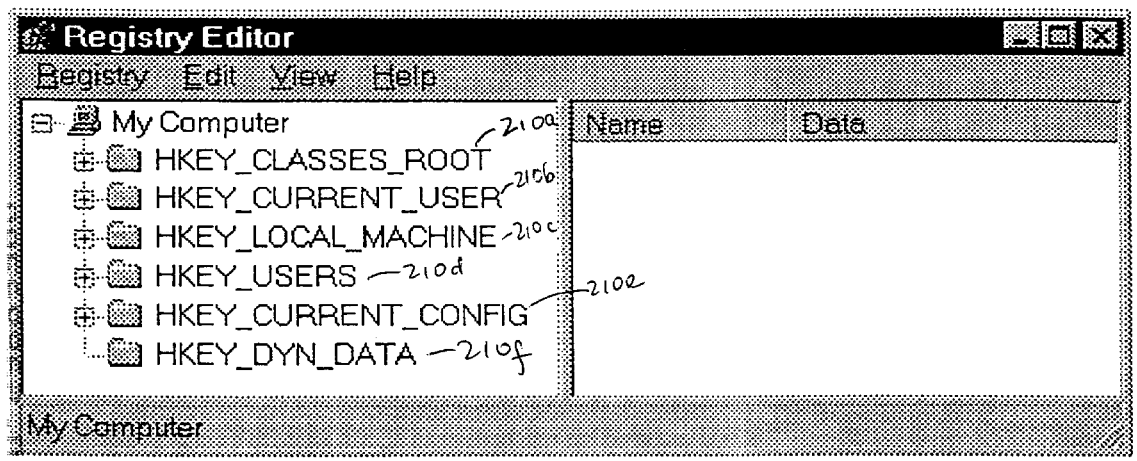
FIG. 2 is a graphical representation of an exemplary system registry.

The system registry has a hierarchical structure. Although the registry looks complicated, its structure is similar to the directory structure of a file system. An exemplary hierarchical structure of the system registry for Windows 95® and Windows 98®, as graphically illustrated by registry editor "regedit.exe" is shown in FIG. 2. As illustrated, each main branch 210a–210f (denoted by a folder icon) is called a hive, and hives contains keys. Each key can contain other keys (sometimes referred to as sub-keys), as well as values. The values contain the actual information stored in the system registry. In Windows 95® and Windows 98®, there are three types of values: string, binary, and DWORD. There are six main branches 210a–210f, each containing a specific portion of the information stored in the system registry. The branch name and descriptions of their corresponding content are illustrated below in Table 1.

TABLE 1

| Branch Names | Content Description |
| --- | --- |
| HKEY_CLASSES_ROOT | This branch contains file association types, OLE information and shortcut data. |
| HKEY_CURRENT_USER | This branch links to the section of HKEY_USERS corresponding to the user currently logged onto the PC. |
| HKEY_LOCAL_MACHINE | This branch contains computer specific information about the type of hardware, software, and other preferences on a given PC. This information is used by all users who use the given computer. |

TABLE 1-continued

| Branch Names | Content Description |
| --- | --- |
| HKEY_USERS | This branch contains individual preferences for each user of the computer. Each user is represented by a SID sub-key located under the main branch. |
| HKEY_CURRENT_CONFIG | This branch links to the section of HKEY_LOCAL_MACHINE appropriate for the current hardware configuration. |
| HKEY_DYN_DATA | This branch points to the part of HKEY_LOCAL_MACHINE, for use with the Plug-&-Play features of Windows ™, this section is dynamic and will change as devices are added and removed from the system. |

METHODS OF DETERMINING WHETHER A NETWORK INTERFACE CARD ENTRY WITHIN THE SYSTEM REGISTRY IS "REAL" OR "VIRTUAL"

Figure 3:
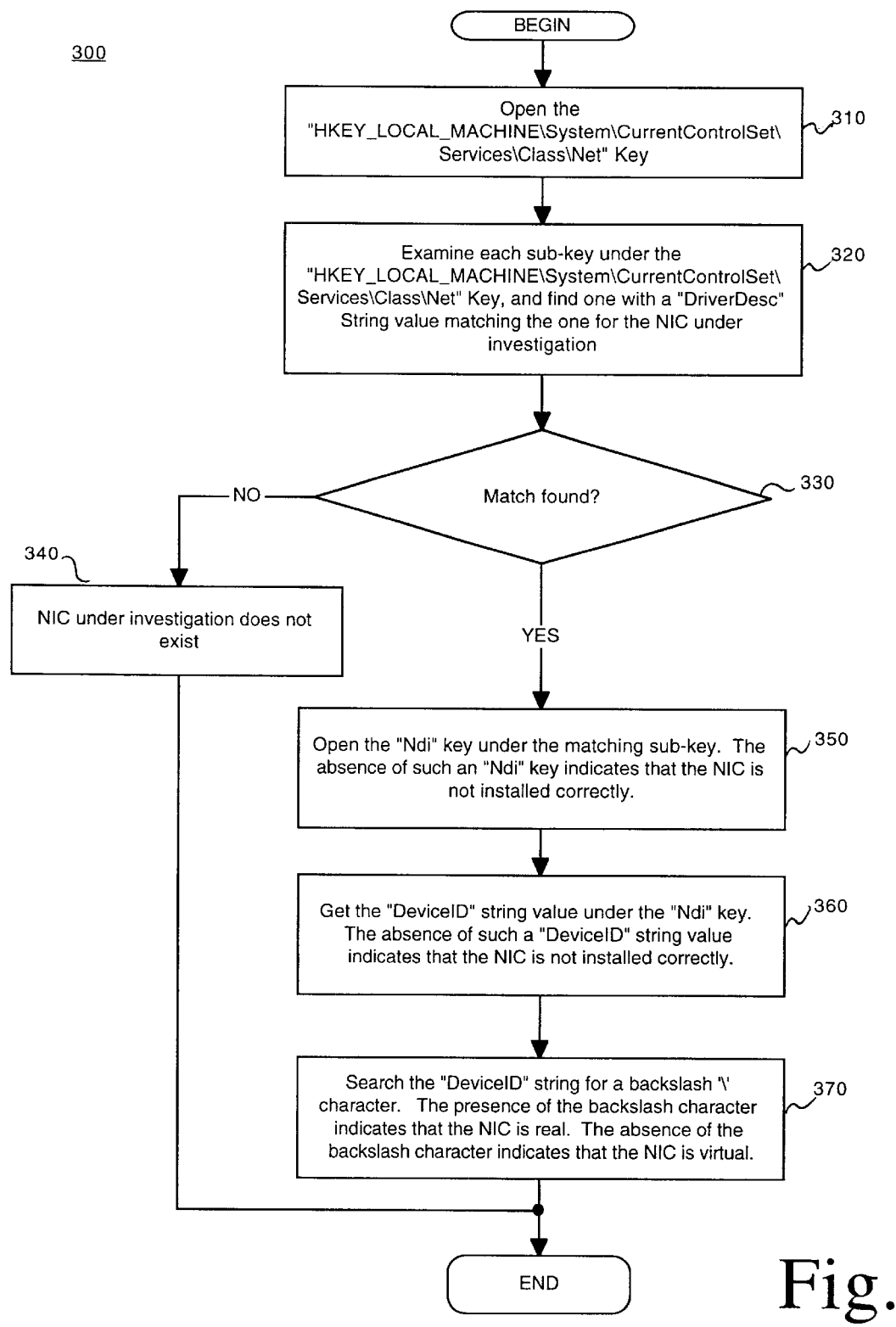
FIG. 3 is a flow chart diagram illustrating the method of determining whether a network interface card entry of the system registry is associated with a "real" network interface card or a "virtual" network interface card according to one embodiment of the present invention.

FIG. 3 is a flow chart diagram illustrating the process 300 of determining whether a network interface card entry of the system registry (e.g., a sub-key) is associated with a "real" NIC or a "virtual" NIC according to one embodiment of the present invention. It should be appreciated that, in furtherance of the present embodiment, process 300 may be carried out manually by using a system registry editor such as "regedit.exe" which is shipped with most Windows 95® and Windows 98® operating systems. Process 300 may also be carried out automatically when implemented as process steps of a network configuration software.

As illustrated, at step 310, process 300 of the present embodiment opens the "HKEY_LOCAL_MACHINE\System\CurrentControlSet\Services\Class\Net" key ("Net" key) of the system registry. As discussed above, the system registry is a database for storing hardware and software configuration information of a computer system. Further, as discussed above, the "HKEY_LOCAL_MACHINE" branch of the system registry contains computer specific information about the hardware and software installed on the computer system. In particular, information regarding NICs is customarily stored under the "Net" key.

At step 320, process 300 of the present embodiment examines the sub-keys under the "Net" key, and finds a sub-key that has a "DriverDesc" String value that matches the String value for the NIC entry under investigation.

At step 330, it is determined whether a match is found. If it is determined that a match is not found, then, at step 340, it can be concluded that there is no corresponding "real" or "virtual" NIC for the NIC entry. Then, the process 300 ends.

However, if it is determined that a match is found, process 300 opens the "Ndi" key under the matching sub-key at step 350. In accordance with the present embodiment, if the "Ndi" key cannot be found, then it can be concluded that the NIC (whether "real" or "virtual") is not installed correctly.

At step 360, after the "Ndi" key is opened, process 300 gets the "DeviceID" String value under the "Ndi" key. In accordance with the present embodiment, if the "DeviceID" String value cannot be found, then it can be concluded that the NIC (whether "real" or "virtual") is not installed correctly.

At step 370, process 300 searches the "DeviceID" String value for a backslash '\' character. In the present embodiment, the presence of the backslash '\' character within the "DeviceID" String indicates that the NIC entry under investigation is associated with a physical hardware device. On the other hand, if the "DeviceID" String does not contain a backslash '\' character, then it can be concluded that the NIC entry is not associated with any physical hardware device and is therefore "virtual." Thereafter, process 300 ends.

Figure 4:
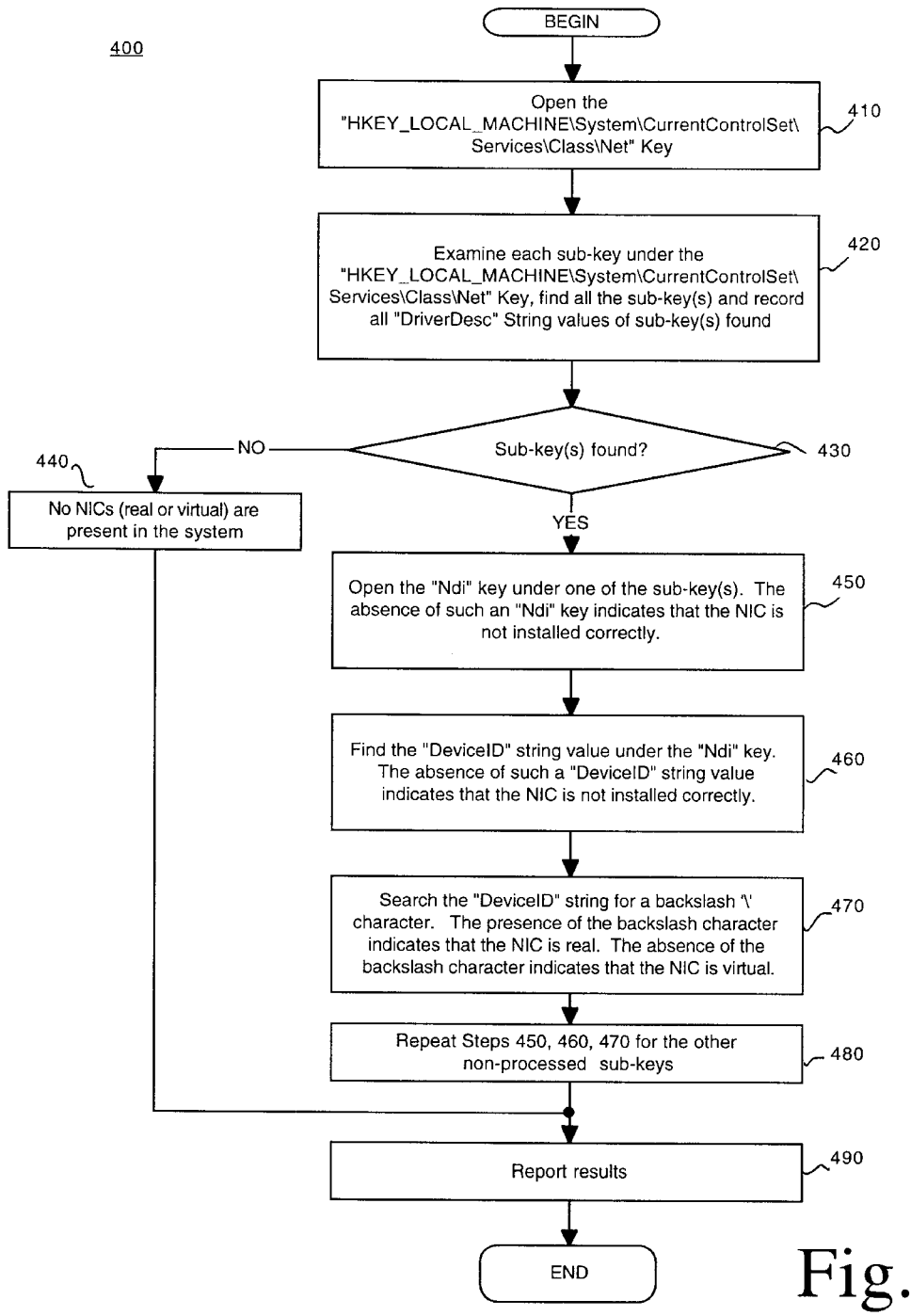
FIG. 4 is a flow chart diagram illustrating the method of determining whether a network interface card entry of the system registry is associated with a "real" network interface card or a "virtual" network interface card according to another embodiment of the present invention.

FIG. 4 is a flow chart diagram illustrating the process 400 of determining whether a network interface card entry of the system registry is associated with a "real" network interface card or a "virtual" network interface card according to another embodiment of the present invention. In furtherance of the present embodiment, process 400 is implemented as process steps of a network configuration software and is performed automatically when the network configuration software is run. It should be appreciated that steps of process 400 may be implemented with well known Windows™ APIs (Application Programming Interfaces) that are not described herein in detail to avoid obscuring aspects of the present invention.

As illustrated, at step 410, process 400 of the present embodiment opens the "HKEY_LOCAL_MACHINE\System\CurrentControlSet\Services\Class\Net" key ("Net" key) of the system registry. As discussed above, the system registry is a database for storing hardware and software configuration information of a computer system. Further, as discussed above, the "HKEY_LOCAL_MACHINE" branch of the system registry contains computer specific information about the hardware and software installed on the computer system. Further, information regarding NICs is customarily stored under the "Net" key.

At step 420, process 400 of the present embodiment examines the sub-keys under the "Net" key, finds all the sub-keys and records all the "DriverDesc" String values of the sub-keys. Under normal Windows 95® or Windows 98® operations, each sub-key under the "Net" key should have at least one "DriverDesc" string.

At step 430, it is determined whether any sub-keys are found. If it is determined that no sub-keys are found, then, at step 440, it can be concluded that there are no "real" or "virtual" NICs present in the computer system. Then, at step 490, process 400 reports that no "real" or "virtual" NIC is present. Thereafter, the process 400 ends.

However, if it is determined that at least one sub-key is found, process 400 opens the "Ndi" key under one of the sub-key(s) at step 450. In accordance with the present embodiment, if the "Ndi" key cannot be found, then it can be concluded that the NIC described by the sub-key (whether "real" or "virtual") is not installed correctly.

At step 460, after the "Ndi" key is opened, process 400 gets the "DeviceID" String value under the "Ndi" key. In accordance with the present embodiment, if the "DeviceID" String value cannot be found, then it can be concluded that the NIC (whether "real" or "virtual") is not installed correctly.

At step 470, process 400 searches the "DeviceID" String value for a backslash '\' character. In the present embodiment, the presence of the backslash '\' character within the "DeviceID" String indicates that the NIC entry under investigation is associated with a physical hardware device. On the other hand, if the "DeviceID" String does not contain a backslash '\' character, then it can be concluded that the NIC entry is not associated with any physical hardware device and is therefore "virtual."

With reference still to FIG. 4, at step 480, if more than one sub-keys is found at step 420, steps 450, 460 and 470 are repeated for each of the non-processed sub-keys.

At step 490, after all the information contained within the sub-key(s) are processed, process 400 reports the identity of the NICs present and whether each NIC is "real" or "virtual". Thereafter, process 400 ends.

In furtherance of one embodiment of the present invention, other network configuration steps are carried out based upon the results of process 300 or process 400. For instance, when a "real" NIC is identified, network configuration software would then be able to alter the settings of the NIC.

The present invention, a method of determining whether a NIC entry within the system registry is associated with "real" hardware or is associated with a "virtual" device, has thus been disclosed. The present invention allows such determination to be made easily through the examination of the system registry. While the present invention has been described in particular embodiments, it should be appreciated that the present invention should not be construed as limited by such embodiments, but should be construed according to the claims below.

What is claimed is:

1. In a computer system running on a Windows™-based operating system, a method of determining whether a network interface card entry of a system registry of said computer system is associated with physical hardware device, said method comprising the steps of:

opening a Net key entry of said system registry wherein said Net key entry includes a plurality of sub-key entries and wherein said Net key entry stores registry entries pertaining to network interface cards;

opening a respective one of said plurality of sub-key entries;

examining a driver description string stored within said respective sub-key entry;

provided that a value stored as part of said driver description string matches said network interface card entry, opening an "Ndi" key under said respective sub-key entry and searching for a backslash character within a device identification string under said "Ndi" key, wherein presence of said backslash character indicates that said network interface card entry is associated with physical hardware device.

2. A method as recited in claim 1 wherein absence of said backslash character indicates that said network interface card entry is not associated with physical hardware device and is associated with a virtual network interface card.

3. A method as recited in claim 1 wherein absence of a driver description string value that matches said network interface card entry indicates that an installation error has occurred.

4. A method as recited in claim 1 wherein absence of said device identification string indicates that an installation error has occurred.

5. A method as recited in claim 1 wherein absence of said "Ndi" key indicates that an installation error has occurred.

6. A method as recited in claim 1 wherein said Net key entry comprises a

"HKEY_LOCAL_MACHINE\System\ Current Control Set\Services\Class\N et" entry.

7. A method as recited in claim 1 wherein said driver description string comprises a "DriverDesc" string.

8. A method as recited in claim 1 wherein said device identification string comprises a "DeviceID" string.

9. A computer readable medium having contained therein computer readable codes for causing a computer system running on a Windows™-based operating system to perform a method of determining whether a network interface card entry of a system registry of said computer system is associated with physical hardware device, said method comprising the steps of:

opening a Net key entry of said system registry wherein said Net key entry includes a plurality of sub-key entries and wherein said Net key entry stores registry entries pertaining to network interface cards;

opening a respective one of said plurality of sub-key entries;

examining a driver description string stored within said respective sub-key entry;

provided that a value stored as part of said driver description string matches said network interface card entry, opening an "Ndi" key under said respective sub-key entry and searching for a backslash character within a device identification string under said "Ndi" key, wherein presence of said backslash character indicates that said network interface card entry is associated with physical hardware device.

10. A computer readable medium as recited in claim 9 wherein absence of said backslash character indicates that said network interface card entry is not associated with physical hardware device and is associated with a virtual network interface card.

11. A computer readable medium as recited in claim 9 wherein absence of a driver description string value that matches said network interface card entry indicates that an installation error has occurred.

12. A computer readable medium as recited in claim 9 wherein absence of said device identification string indicates that an installation error has occurred.

13. A computer readable medium as recited in claim 9 wherein absence of said "Ndi" key indicates that an installation error has occurred.

14. A computer readable medium as recited in claim 9 wherein said Net key entry comprises a "HKEY_LOCAL_MACHINE\System\ Current Control Set\Services\Class\N et" entry.

15. A computer readable medium as recited in claim 9 wherein said driver description string comprises a "DriverDesc" string.

16. A computer readable medium as recited in claim 9 wherein said device identification string comprises a "DeviceID" string.

17. In a computer system running on a Windows™-based operating system, a method of determining whether a network interface card entry of a system registry of said computer system is associated with physical hardware device, said method comprising the steps of:

searching said system registry for a Net key entry that includes a driver description string associated with said network interface card entry;

opening a sub-key entry under said Net key entry;

under said sub-key entry, searching for a driver description string associated with said network interface card entry;

opening an "Ndi" key under said sub-key entry;

under said "Ndi" key, searching for a device identification string; and searching said device identification string for a backslash character, wherein presence of said backslash character indicates that said network interface card entry is associated with physical hardware device.

18. A method as recited in claim 17 wherein absence of said backslash character indicates that said network interface card entry is not associated with physical hardware device and is associated with a virtual network interface card.

19. A method as recited in claim 17 wherein absence of a driver description string value that matches said network interface card entry indicates that an installation error has occurred.

20. A method as recited in claim 17 wherein absence of said device identification string indicates that an installation error has occurred.

21. A method as recited in claim 17 wherein absence of said "Ndi" key indicates that an installation error has occurred.

22. A method as recited in claim 17 wherein said Net key entry comprises a

"HKEY_LOCAL_MACHINE\System\ Current Control Set\Services\Class\N et" entry.

23. A method as recited in claim 17 wherein said driver description string comprises a "DriverDesc" string.

24. A method as recited in claim 17 wherein said device identification string comprises a "DeviceID" string.

* * * * *